United States Patent [19]

Miki et al.

[11] Patent Number: 4,762,569

[45] Date of Patent: Aug. 9, 1988

[54] EASILY DISPERSIBLE PIGMENT COMPOSITION AND DISPERSING METHOD

[75] Inventors: Toshiyuki Miki; Mitsumasa Takeya, both of Himeji, Japan

[73] Assignee: Sanyo Color Works, Ltd., Himeji, Japan

[21] Appl. No.: 83,694

[22] Filed: Aug. 7, 1987

[51] Int. Cl.[4] .............................................. C04B 14/00
[52] U.S. Cl. .................................. 106/476; 106/505; 106/493; 106/497
[58] Field of Search ............ 106/288 B, 288 Q, 308 N

[56] References Cited

U.S. PATENT DOCUMENTS

| | | | |
|---|---|---|---|
| 3,275,637 | 9/1966 | West et al. ...................... | 106/288 Q |
| 3,296,001 | 1/1967 | Ambler et al. ...................... | 106/30 |
| 3,532,520 | 10/1970 | Dawson et al. ...................... | 106/23 |
| 3,582,380 | 6/1971 | Hamilton ........................ | 106/288 Q |
| 4,174,998 | 11/1979 | Shiel ................................ | 106/308 N |
| 4,370,171 | 1/1983 | Robinson et al. ............... | 106/308 N |
| 4,391,648 | 7/1983 | Ferrill, Jr. ...................... | 106/298 |

*Primary Examiner*—A. Lionel Clingman
*Assistant Examiner*—Willie J. Thompson

*Attorney, Agent, or Firm*—Frishauf, Holtz, Goodman & Woodward

[57] ABSTRACT

The present invention relates to a easily dispersible pigment composition for non-aqueous vehicles, comprising 100 wt. parts of organic pigment or inorganic pigment and 0.5-15 wt. parts of tetracarboxylic acid diimid compound having the following formula [I], and a method for dispersing pigment in non-aqueous vehicle, comprising use of 0.5-15 wt. parts of the compound having the following formula [I] against 100 wt. parts of organic or inorganic pigment.

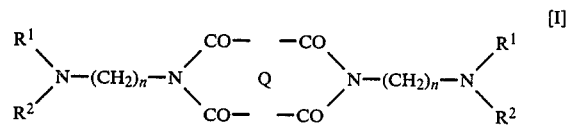

In the formula [I], Q shows naphthaline radical or perylene radical having 4 carbonyl radicals at peri-positions and $R^1$ and $R^2$ show either the same or differently hydrogen atom or alkyl radical having 1-2 carbon atoms, and n is 2 or 3.

8 Claims, No Drawings

EASILY DISPERSIBLE PIGMENT COMPOSITION AND DISPERSING METHOD

FIELD OF THE ART

This invention relates to organic pigment or inorganic pigment composition and dispersing method which are effective for dispersing pigment into non-aqueous vehicle.

BACKGROUND OF THE INVENTION

Generally speaking, pigments, when they are dispersed into vehicle for paint or ink, causes agglomeration in the vehicle and such agglomeration causes undesirable phenomena such as aggravation of flow, separation color due to poor compatability with other pigment when the pigment is mixed with other pigment, and lowering of surface gloss.

In order to improve or remove the defects of such pigment, various methods are proposed which include such as (1) surface-treatment of pigment using surface-active agent or metal soap, (2) use of various types of resin and (3) use of various types of derivative of organic pigment. For example, treatment of phthalocyanine blue with calcium salt of rosin is proposed in U.S. Pat. No. 3,296,001, treatment of lithol rubine with metal salt of dialkyl sulfosuccinate is proposed in U.S. Pat. No. 3,582,380 and treatment of phthalocyanine green with aromatic polyester is proposed in U.S. Pat. No. 4,391,648. In U.S. Pat. No. 3,275,637, utilization of derivative of quinacridone pigment and in U.S. Pat. No. 3,532,520, utilization of derivative of disazo yellow are reported, respectively. They are, however, not satisfactory in that those materials do not give non-agglomerating property of pigment to be used, especially, for metallic paint. In fact, metallic paint does not have sufficient clearness nor tinting strength.

DISCLOSURE OF THE INVENTION

With the present invention, we offer a easily dispersible pigment composition and a dispersing method with which a remarkable improvement of flow property and non-agglomerating property of pigments in non-aqueous vehicle could be attained with organic pigments such as perylene-perinone type, quinacridone type, indanthrene type, iso-indoline type, phthalocyanine type, etc. and inorganic pigments such as carbon black etc. Further the easily dispersible composition and the dispersing method of the invention give clearness and tinting strength particularly to metallic paint and/or coating. With the present invention, the earlier said defects that the conventional type of pigment has, are removed or solved.

The present invention is a easily dispersible pigment composition for non-aqueous vehicle, comprising 100 wt. parts of organic pigment or inorganic pigment and 0.5–15 wt. parts of tetracarboxylic acid diimid compound having the general formula [I], and a method for dispersing pigment in non-aqueous vehicle, comprising use of 0.5–15 wt. parts of the compound [I] against 100 wt. parts of organic pigment or inorganic pigment.

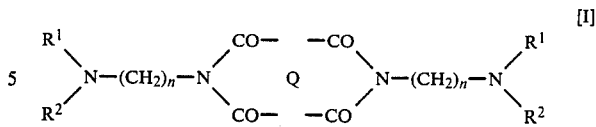

In the formula [I], Q shows naphthalene radical or perylene radical having 4 carbonyl radicals at peri-positions and $R^1$ and $R^2$ show either the same or differently hydrogen atoms or alkyl radical having 1–2 carbon atoms and n is 2 or 3. By using the compound of the present invention expressed by the the general formula [I] in the recipe with organic pigment or inorganic pigment, the earlier mentioned defects are removed and remarkable effect were confirmed. The present invention is characterized also by easiness or simplicity of preparing the compound of the invention and the composition or the method of the invention.

The compound [I] are easily obtained by reacting amine with tetracarboxylic acid dianhydride of peri-substituted condensed benzene ring of naphthalene or perylene. As typical amines, there are, for example, dimethylaminopropylamine, diethylaminopropylamine, methylaminopropylamine, ethylaminopropylamine, dimethylaminoethylamine, diethylaminoethylamine, methylaminoethylamine and ethylaminoethylamine.

In order to obtain the compound of the invention having the formula [I], above tetracarboxylic acid dianhydride and amine were reacted for several hours at more than 100° C. in organic solvent and the solvent was removed by distillation and water was added to the resultant reaction product. The solution was filtered and the filtrate was washed with water, dried and pulverized. In some cases, the reaction was carried out in water instead of using organic solvent, for several hours at 70°–90° C. and objective compound of the invention is easily obtained.

In a recipe comprising 100 wt. parts of organic pigment or inorganic pigment, if 0.5–15 wt. parts, preferably 1–10 wt. parts, of the compound of the invention are incorporated, excellent effect on flow property and non-agglomerating property of pigment in non-aqueous vehicle are observed. In the case that the wt. parts of the compound in the recipe is less than 0.5 wt. parts, the effect was less than it was hoped for and in the case that the wt. parts is more than 15 wt. parts, the effect remained same as those of less than 15 parts, and in some cases tinting strength are lowered due to the relative degradation of purity of the pigment used.

In order to disperse organic pigment or inorganic pigment using the compound of the invention, usually the compound is blended with pigment by powder blending. But the compound may be either added to non-aqueous vehicle together with said pigment or compounded into pigment when the pigment is prepared. In any case, satisfactory results with remarkably improved flow property and non-agglomerating property are obtained. Followings are examples of organic pigments mentioned in the invention.

In a general formula:

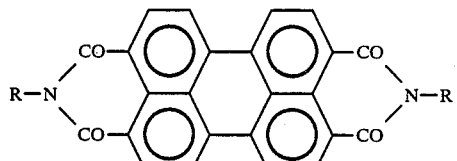
| C.I. Pig. Red No. | R |
|---|---|
| 123 | 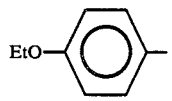 |
| 149 | 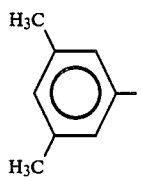 |
| 178 | 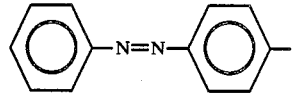 |
| 179 |  CH$_3$— |
C.I. Pig. Red 224
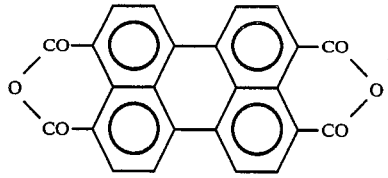
C.I. Pig. Brown 26
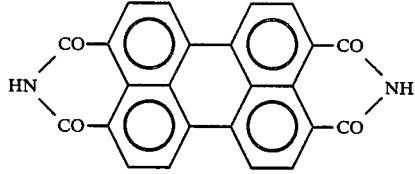
C.I. Pig. Orange 43
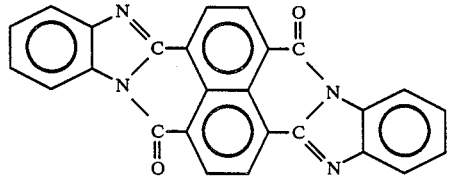
C.I. Pig. Red 194
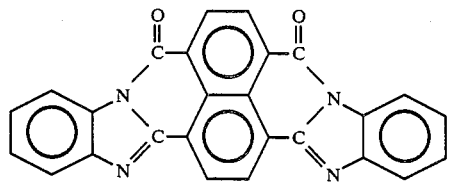

-continued
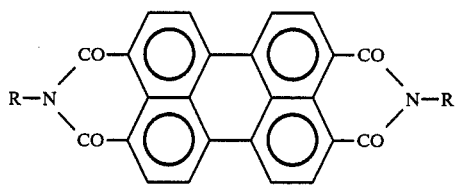
In a general formula:
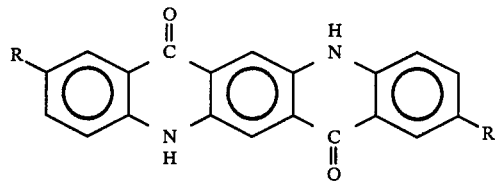
| C.I. Pig. No. | R |
|---|---|
| Violet 19 | H |
| Red 122 | $CH_3$ |
| Red 202 | Cl |
C.I. Pig. Blue 15:1
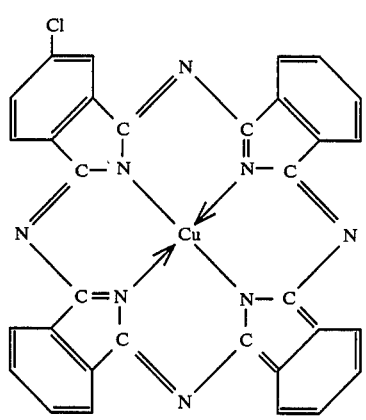
C.I. Pig. Blue 15:3
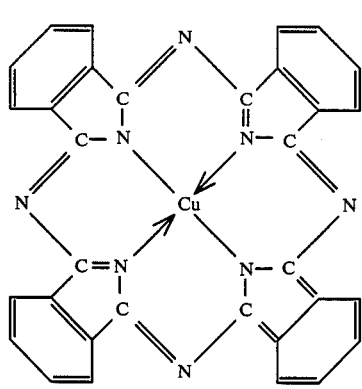
C.I. Pig. Blue 60
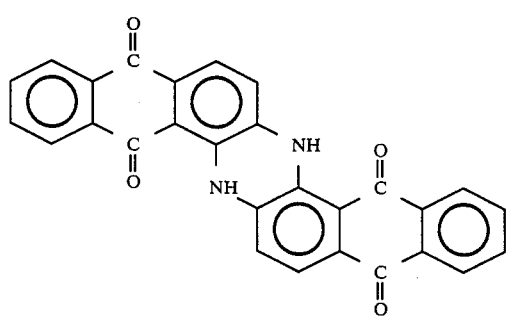

-continued

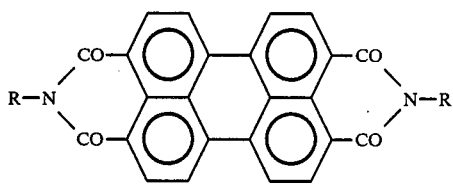

C.I. Pig. Yellow 110

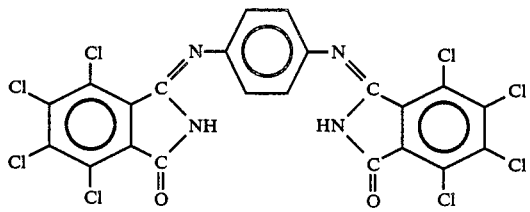

As an example of inorganic pigment, there is carbon black.

The effects of the composition and the method of the invention are shown by some examples, as follows.

EXAMPLE 1

12 wt. parts of dianhydride of 3, 4, 9, 10 perylene tetracarboxylic acid and 16 wt. parts of diethylaminopropylamine were added to 20 wt. parts of ortho dichlorobenzene and the mixture was agitated for 3 hours at 120° C. Ortho dichlorobenzene was removed by distillation under reduced pressure. Water was added to the resultant reaction product and the product was filtered and the filtrate was washed with water, dried and pulverized to obtain 12.8 wt. parts of the compound [I] of the general formula:

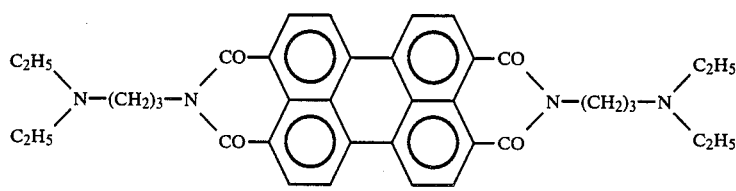

NMR spectrum of the obtained compound is as follows.

| Position (δ) | Shape | Number of Hydrogens |
| --- | --- | --- |
| 1.3 | triplet | 12 |
| 1.95 | multiplet | 4 |
| 2.6 | multiplet | 12 |
| 4.25 | triplet | 4 |
| 8.7 | AB-quartet | 8 |

EXAMPLE 1-a

For the regulation of pigment which is based on C.I. Pig. Red 179, a material consisting of
  100 parts of coarse C.I. Pig. Red 179,
  500 parts of anhydrous sodium sulfate, and
  120 parts of diethylene glycol
was put into 1 liter capacity sigma mixer and was ground at 60°–65° C. The material was then put into 3,500 wt. parts of water and agitated for 2 hours at 70° C. The mixture was filtered, washed and dried to obtain 96 wt. parts of finely pulverized pigment. Addition of the compound [II] (modifier):

After grinding the material specified in Example 1-a above for 6 hours under the same condition, 6 parts of the compound [II] were added to the mixture and it was ground for another 1 hour in the same manner. Thereafter the mixture was filtered, washed with water and dried to obtain a regulated pigment composition in a form that the compound [II] was uniformly mixed.

Preparation of paint and effect of the invention:
  5 parts of finely pulverized Pig. Red 179 obtained by the above mentioned procedure
  15 parts of acrydic 47-712 (acrylic resin, sold content 50%, Dainihon Ink Chemical & Industrial Co., Ltd., Japan)
  25 parts of thinner
  300 parts of steel beads (diameter 1.5 mm)
were put into a 150 ml glass container and the mixture was treated by a paint conditioner for 60 minutes to obtain a good dispersion. Thereafter, 13.1 parts of acrydic 47-712 and 10.0 parts of Super Beckamine L-117-60 (isobutylated melamine resine, solid content 60%, Dainippon Ink Chemical & Industrial Co., Ltd., Japan) were added and dispersed for another 10 minutes. The obtained paint was separated from steel beads and its viscosity, its gloss and clearness after painting were measured. As shown on Table 1, the paint which contained the compound [II] of the invention showed excellent properties.

TABLE 1

| | viscosity (cps) | | | gloss (%) | clearness (C*) |
| --- | --- | --- | --- | --- | --- |
| | 6 rpm | 60 rpm | 6/60 ratio | | |
| Paint containing compound [II] | 186 | 188 | 1.0 | 84.7 | 22.74 |
| Paint containing | 2450 | 744 | 3.3 | 75.7 | 20.84 |

TABLE 1-continued

| | viscosity (cps) | | | gloss | clearness |
|---|---|---|---|---|---|
| | 6 rpm | 60 rpm | 6/60 ratio | (%) | (C*) |
| no compound [II] | | | | | |

Viscosity is measured by Brookfield type viscometer.
Gloss is measured by 60°/60° reflection rate of glossmeter.
Clearness is measured based on indication method of Commission Internationale de l'Eclaisage (1976).

EXAMPLE 2

8 wt. parts of dianhydride of 1, 4, 5, 8 naphthaline tetracarboxylic acid and 12 wt. parts of dimethylaminopropylamine were added to 50 wt. parts of water and the mixture was agitated for 1 hour at 80° C. Water was added to the resultant reaction product and the product was filtered and the filtrate was washed with water, dried and pulverized to obtain 11.9 wt. parts of the compound [III] of the general formula:

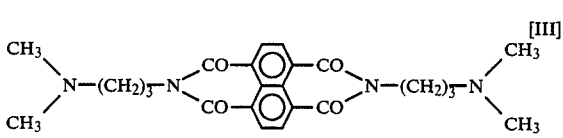

NMR spectrum of the obtained compound is as follows.

| Position (δ) | Shape | Number of Hydrogens |
|---|---|---|
| 1.9 | multiplet | 4 |
| 2.2 | singlet | 12 |
| 2.5 | triplet | 4 |
| 4.25 | triplet | 4 |
| 8.7 | AB-quartet | 4 |

EXAMPLE 2-a 10 parts of C.I. Pig. Violet 19, 20 parts of acrydic 47–712, 24 parts of thinner, 0.5 parts of compound [III] of the invention and 100 parts of alumina beads (diameter 3 mm) were put into a 150 ml glass container and the mixture was treated by a paint conditioner for 60 minutes to obtain a good dispersion. Thereafter, 13.0 parts of acrydic 47–712 and 12.0 parts of Super Beckamine L-117-60 were added and dispersed for another 10 minutes. The paint was separated from alumina beads and its viscosity, its gloss and clearness after painting were measured. The results were excellent as shown in Table 2.

EXAMPLE 2-b AS COMPARISON

In Example 2-b, the same procedures were taken as in Example 2-a, except that the compound [III] was not added. The paint thus obtained was inferior to that obtained in Example 2-a, as shown in Table 2.

EXAMPLE 2-c AS COMPARISON

In Example 2-c, the same procedures were taken as in Example 2-a, except that 0.3 parts of carboxybenzimid quinacridone which was obtained by the method described in the Example of U.S. Pat. No. 3,275,637 was used instead of using 0.5 parts of the compound [III]. The paint thus obtained was inferior to that obtained 2-a, as shown in Table 2.

TABLE 2

| | viscosity (cps) | | | gloss | clearness |
|---|---|---|---|---|---|
| | 6 rpm | 60 rpm | 6/60 ratio | (%) | (C*) |
| Example 2-a | 565 | 510 | 1.1 | 86.3 | 52.71 |
| Comparison 2-b | 8880 | 1602 | 5.5 | 62.8 | 44.80 |
| Comparison 2-c | 7207 | 1130 | 6.4 | 63.5 | 47.90 |

EXAMPLE 3

17.9 wt. parts of dianhydride of 1, 4, 5, 8 naphthaline tetracarboxylic acid and 34.8 wt. parts of diethylaminopropylamine were added to 150 wt. parts of water and the mixture was agitated for 5 hours at 85°–88° C. Water was added to the resultant reaction product and the product was filtered and the filtrate was washed with water, dried and pulverized to obtain 20 wt. parts of the compound [IV] of the general formula:

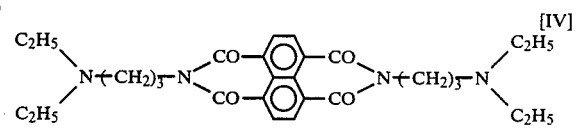

NMR spectrum of the obtained compound [IV] is as follows.

| Position (δ) | Shape | Number of Hydrogens |
|---|---|---|
| 1.0 | triplet | 12 |
| 1.9 | multiplet | 4 |
| 2.5 | multiplet | 12 |
| 4.2 | triplet | 4 |
| 8.7 | singlet | 4 |

EXAMPLE 3-a

Mixture of 5 parts of C.I. Pig. Orange 43, 0.4 parts of the compound of [IV], 15 parts of acrydic 47–712, 22 parts of thinner and 100 parts of alumina beads were dispersed in a paint conditioner for 90 minutes. Thereafter, 13.1 parts of acrydic 47–712 and 10.0 parts of Super Beckamine L-117-60 were added and dispersed for 10 minutes. Obtained enamel paint was separated from alumina beads and its viscosity, its gloss and clearness after painting were measured. The results were excellent, as shown in Table 3.

EXAMPLE 3-b AS COMPARISON

In Example 3-b, the same procedures were taken as in Example 3-a, except that the compound [IV] was not added. The obtained enamel paint was inferior to that obtained in Example 3-a, as shown in Table 3.

TABLE 3

| | viscosity (cps) | | | gloss | clearness |
|---|---|---|---|---|---|
| | 6 rpm | 60 rpm | 6/60 ratio | (%) | (C*) |
| Example 3-a | 5020 | 1530 | 3.3 | 62.3 | 76.39 |
| Comparison 3-b | 7440 | 1768 | 4.2 | 51.1 | 73.86 |

EXAMPLE 4

24 wt. parts of dianhydride of 3, 4, 9, 10 perylene tetracarboxylic acid and 25 wt. parts of dimethylaminopropylamine were added to 250 wt. parts of water and the mixture was agitated for 5 hours at 85°–88° C. Water was added to the resultant reaction product and the product was filtered and the filtrate was washed with water, dried and pulverized to obtain 29.6 parts of the compound [V] of the general formula:

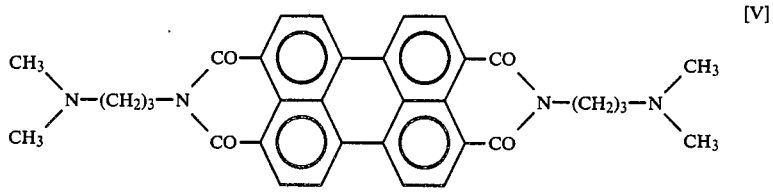

[V]

NMR spectrum of the obtained compound [V] is as follows.

| Position (δ) | Shape | Number of Hydrogens |
|---|---|---|
| 1.9 | multiplet | 4 |
| 2.2 | singlet | 12 |
| 2.5 | triplet | 4 |
| 4.3 | triplet | 4 |
| 8.7 | AB-quartet | 8 |

EXAMPLE 4-a

Preparation of enamel paint having original color:

6 parts of C.I. Pig. Red 224, 15 parts of acrydic 47–712, 15 parts of thinner, 0.25 parts of the compound [V] and 100 parts of alumina beads put into a 150 ml glass container and the mixture was treated by a paint conditioner for 90 minutes to obtain a good dispersion. Thereafter 27.0 parts of acrydic 47–712, 15.0 parts of Super Beckamine L-117-60 and 14.0 parts of thinner were added and dispersed for another 10 minutes. The obtained paint was separated from alumina beads.

Preparative of silver enamel paint:

7 parts of Aluminum Powder paste (solid content: 70 wt.%), 46 parts of acrydic 47–712, 16 parts of Super Beckamine L-117-60 and 6 parts of thinner were put into a 150 ml glass container and the mixture was treated by a paint conditioner for 30 minutes to obtain a good dispersion Preparation of metallic enamel paint:

Enamel paint having original color and silver enamel paint were mixed in accordance with the following ratio.

| Al/Pig. ratio | 10/90 | 50/50 | 90/10 |
|---|---|---|---|
| Enamel paint having original color (parts) | 800 | 89 | 9.9 |
| Silver enamel paint (parts) | 100 | 100 | 100 |

The viscosity of enamel paint having original color and the clearness of coated surface prepared by base-coat/-clear-coat system using thus obtained metallic enamel paint were measured. The result of Example 4-a were excellent, as shown in Table 4.

EXAMPLE 4-b AS COMPARISON

In Example 4-b, the same procedures were taken as in Example 4-a, except that the compound [V] was not added. The result of Example 4-b was inferior to that obtained in Example 4-a, as shown in Table 4.

TABLE 4

| | viscosity of enamel paint having original color (cps) | | | clearness of coated surface of metallic enamel (C*) | | |
|---|---|---|---|---|---|---|
| | | | 6/60 | Al/Pig. ratio | | |
| | 6 rpm | 60 rpm | ratio | 10/90 | 50/50 | 90/10 |
| Example 4-a | 578 | 570 | 1.0 | 70.16 | 51.83 | 20.19 |
| Comparison 4-b | 990 | 892 | 1.1 | 64.81 | 48.64 | 19.56 |

EXAMPLE 5

16 wt. parts of dianhydride of 3, 4, 8, 10 perylene tetracarboxylic acid and 20 wt. parts of methylaminoethylamine were added to 100 wt. parts of water and the mixture was agitated for 3 hours at 85° C. Water was added to the resultant reaction product and the product was filtered and the filtrate was washed with water, dried and pulverized to obtain 19.1 wt. parts of the compound [VI] of the general formula:

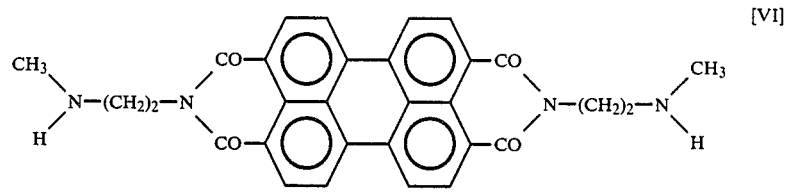

[VI]

NMR spectrum of the obtained compound [VI] is as follows.

| Position (δ) | Shape | Number of Hydrogens |
|---|---|---|
| 2.1 | singlet | 6 |
| 2.55 | multiplet | 6 |
| 4.2 | triplet | 4 |
| 8.55 | AB-quartet | 8 |

EXAMPLES 5-a AND 5-b AS COMPARISON

In Examples 5-a and 5-b, the same procedures were taken as in Examples 2-a and 2-b, except that C.I. Pig. Red 122 is used instead of C.I. Pig. Violet 19 and 0.3 parts of the compound [VI] is used instead of 0.5 parts of the compound [III]. The result was shown in Table 5. Improvement effect based on the compound [VI] was recognized, as shown in Table 5.

TABLE 5

|  | viscosity (cps) | | | gloss (%) | clearness (C*) |
|---|---|---|---|---|---|
|  | 6 rpm | 60 rpm | 6/60 ratio | | |
| Example 5-a | 8125 | 1670 | 4.9 | 55.7 | 34.55 |
| Comparison 5-b | 20000 | 3575 | 5.6 | 42.3 | 30.40 |

EXAMPLES 6-a and 6-b AS COMPARISON

In Example 6-a, the same procedures were taken as in Example 1-a, except that 2.5 parts of Carbon Black (Mitsubishi Kasei Co., Japan, MA-100) is used instead of 5 parts of C.I. Pig. Red 179, and black enamel paint was obtained. In Example 6-b, the same procedures were taken as in Example 6-a, except that the compound [II] was not used. The results of Examples 6-a and 6-b were shown in Table 6.

EXAMPLE 7

In Example 7, the same procedures were taken as in Example 6-a, except that 3 parts of the compound [II] is used instead of 6 parts of the compound [II]. The result was shown in Table 6.

EXAMPLES 8 AND 9

In Examples 8 and 9, the same procedures were taken as in Example 6-a, except use of 6 parts of the compound [III] or the compound [IV] respectively, instead of 6 parts of the compound [II]. Table 6 showed viscosity of the enamel paint, gloss of coated surface and tinting power when the enamel paint is mixed with white enamel paint. As shown in Table 6, the compounds of the invention have excellent effect for dispersion of carbon black in non-aqueous vehicle.

TABLE 6

|  | viscosity (cps) | | | gloss (%) | tinting power (ratio) |
|---|---|---|---|---|---|
|  | 6 rpm | 60 rpm | 6/60 ratio | | |
| Example 6-a | 191 | 191 | 1.0 | 91.6 | 110 |
| Example 7 | 190 | 180 | 1.1 | 93.1 | 108 |
| Example 8 | 188 | 187 | 1.0 | 94.1 | 105 |
| Example 9 | 196 | 196 | 1.0 | 91.1 | 108 |
| Comparison 6-a | 250 | 220 | 1.1 | 86.4 | 100 |

The compounds of the invention have excellent dispersible property of pigment in non-aqueous vehicles. Accordingly, the composition and the method of the invention have capability of giving dispersing property in non-aqueous vehicles, particularly, in stoving type metallic varnish, and the capability is remarkable and far better than other material or modifier could perform. Further, with remarkable improvements, the resultant coated surface, especially, coated surface of metallic paint having excellent clearness and tinting strength was quite satisfactory.

What we claim is:

1. An easily dispersible pigment composition for a non-aqueous vehicle, comprising 100 wt. parts of organic pigment and 0.5-15 wt. parts of tetracarboxylic acid diimide compound having the general formula [I]

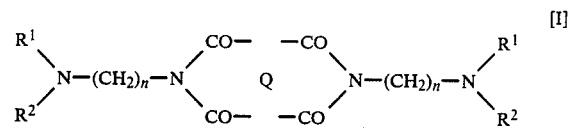

wherein Q is a naphthalene radical or perylene radical which is bonded to the 4 carbonyl radicals at peri-positions and $R^1$ and $R^2$ are each the same or different and are a hydrogen atom or an alkyl radical having 1-2 carbon atoms, and n is 2 or 3.

2. The easily dispersible pigment composition as in claim 1, wherein the organic pigment is perylene perinone type pigment.

3. The easily dispersible pigment composition as in claim 1, wherein the organic pigment is quinacridone type pigment.

4. The easily dispersible pigment composition as in claim 1, wherein the inorganic pigment is carbon black.

5. A method for dispersing pigment in a non-aqueous vehicle, comprising mixing a composition comprising 0.5-15 wt. parts of the compound having the following general formula [I] with 100 wt. parts of organic pigment or inorganic pigment

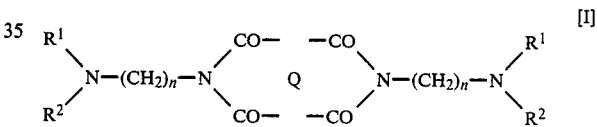

wherein Q is a naphthalene radical or perylene radical which is bonded to the 4 carbonyl radicals at peri-positions and $R^1$ and $R^2$ are each the same or different and are a hydrogen atom or are an alkyl radical having 1-2 carbon atoms, and n is 2 or 3, in a non-aqueous vehicle.

6. The method for dispersing pigment in non-aqueous vehicle as in claim 5, wherein the organic pigment is perylene perinone type pigment.

7. The method for dispersing pigment in non-aqueous vehicle as in claim 5, wherein the organic pigment is quinacridone type pigment.

8. The method for dispersing pigment in non-aqueous vehicle as in claim 5, wherein the inorganic pigment is carbon black.

* * * * *